(12) United States Patent
Mondal et al.

(10) Patent No.: US 10,472,748 B2
(45) Date of Patent: Nov. 12, 2019

(54) MULTI-PLY KNIT FABRIC

(71) Applicant: Milliken & Company, Spartanburg, SC (US)

(72) Inventors: Rajib Mondal, Greer, SC (US); Thomas C. Wiles, Easley, SC (US); Emily W. Michaels, Taylors, SC (US); Petr Valenta, Greer, SC (US); Robert D. Miller, Piedmont, SC (US); James A. Rogers, Greenville, SC (US)

(73) Assignee: Milliken & Company, Spartanburg, SC (US)

( * ) Notice: Subject to any disclaimer, the term of this patent is extended or adjusted under 35 U.S.C. 154(b) by 76 days.

(21) Appl. No.: 15/928,640

(22) Filed: Mar. 22, 2018

(65) Prior Publication Data

US 2018/0290425 A1 Oct. 11, 2018

Related U.S. Application Data

(60) Provisional application No. 62/481,927, filed on Apr. 5, 2017.

(51) Int. Cl.
*D04B 1/16* (2006.01)
*B32B 5/06* (2006.01)
(Continued)

(52) U.S. Cl.
CPC ............. *D04B 1/16* (2013.01); *B32B 5/026* (2013.01); *B32B 5/06* (2013.01); *B32B 5/26* (2013.01);
(Continued)

(58) Field of Classification Search
CPC .......... D04B 1/12; D04B 1/123; D04B 1/126; D04B 1/14; D04B 1/16; D04B 1/24;
(Continued)

(56) References Cited

U.S. PATENT DOCUMENTS

| 2,804,886 A | 9/1957 | White ........................... 139/420 |
| 2,862,283 A | 12/1958 | Rasero ............................... 28/80 |

(Continued)

FOREIGN PATENT DOCUMENTS

| CN | 103572454 | 2/2014 |
| EP | 202897 | 11/1986 |

(Continued)

OTHER PUBLICATIONS

Patent Cooperation Treaty PCT International Search Report. dated Jul. 18, 2018. International Application No. PCT/US2018/023851. International Filing Date: Mar. 22, 2018.

*Primary Examiner* — Danny Worrell
(74) *Attorney, Agent, or Firm* — Cheryl J. Brickey

(57) ABSTRACT

A multi-ply knit fabric containing a first knit ply and a second knit ply. The first knit ply contains a plurality of first yarns and forms the upper surface of the fabric. The second knit ply forms the lower surface of the fabric and contains a plurality of polytetrafluoroethylene (PTFE) yarns having a density of about 2 to 2.25 g/cm$^3$, a transmission in the IR region of 8-10 μm at least about 60%, and a thermal conductivity of at least about 0.2 W/(m·K). The plies are integrated through combined portions formed by at least one of the following methods: interlacing first yarns among the PTFE yarns of the second knit ply, interlacing PTFE yarns among the first yarns of the first knit ply, and interlacing a plurality of third yarns among the first yarns of the first knit ply and the PTFE yarns of the second knit ply.

20 Claims, 6 Drawing Sheets

(51) Int. Cl.
  *D04B 21/20* (2006.01)
  *D04B 21/16* (2006.01)
  *B32B 5/02* (2006.01)
  *B32B 5/26* (2006.01)
  *D04B 1/24* (2006.01)

(52) U.S. Cl.
  CPC .............. *D04B 1/24* (2013.01); *D04B 21/16* (2013.01); *D04B 21/207* (2013.01); *D10B 2321/042* (2013.01); *D10B 2403/0114* (2013.01)

(58) Field of Classification Search
  CPC ........ D04B 1/26; D04B 21/16; D04B 21/207; B32B 5/06; B32B 5/26; B32B 5/026
  See application file for complete search history.

(56) References Cited

U.S. PATENT DOCUMENTS

| | | | |
|---|---|---|---|
| 4,168,298 A * | 9/1979 | Fitzgerald | B29C 55/06 139/420 R |
| 4,569,088 A | 2/1986 | Frankenburg et al. | 2/81 |
| 4,999,243 A | 3/1991 | Maeda | 428/372 |
| 5,735,145 A | 4/1998 | Pernick | 66/196 |
| 5,740,551 A | 4/1998 | Walker | 2/16 |
| 6,061,829 A | 5/2000 | Gunn | 2/69 |
| 6,634,190 B2 | 10/2003 | Didier-Laurent | 66/196 |
| 6,708,348 B1 | 3/2004 | Romay | 2/239 |
| 6,918,140 B1 | 7/2005 | Cooper | 2/228 |
| 7,069,600 B1 * | 7/2006 | Romay | A41B 11/003 2/239 |
| 7,213,420 B2 | 5/2007 | Lynch et al. | 66/186 |
| 8,440,119 B2 | 5/2013 | Ackroyd et al. | 264/78 |
| 8,813,525 B2 | 8/2014 | Ayers et al. | 66/194 |
| 2006/0085894 A1 | 4/2006 | Yakopson et al. | 2/239 |
| 2007/0093162 A1 | 4/2007 | Holcombe et al. | 442/208 |
| 2008/0121305 A1 | 5/2008 | Metzger | 139/421 |
| 2016/0353810 A1 | 12/2016 | Barnes et al. | |
| 2018/0290425 A1 * | 10/2018 | Mondal | D04B 1/24 |

FOREIGN PATENT DOCUMENTS

| | | |
|---|---|---|
| FR | 2 570 935 | 2/2014 |
| WO | WO 2003/031700 | 4/2003 |
| WO | WO 2003/040447 | 5/2003 |
| WO | WO 2011/114107 | 9/2011 |

* cited by examiner

| Feeds | Back Side | | | | Front Side | | | |
|---|---|---|---|---|---|---|---|---|
| 1 | X | X | X | X | | | • | |
| 2 | | | | | X | X | X | X |
| 3 | X | X | X | X | | | • | |
| 4 | | | | | X | X | X | X |
| 5 | X | X | X | X | • | | | |
| 6 | | | | | X | X | X | X |
| 7 | X | X | X | X | • | | | |
| 8 | | | | | X | X | X | X |

FIG. 6

MULTI-PLY KNIT FABRIC

RELATED APPLICATIONS

This application claims priority to U.S. Provisional Patent Application 62/481,927, filed on Apr. 5, 2017, which is herein incorporated by reference in its entirety.

TECHNICAL FIELD OF THE INVENTION

The present invention is directed multi-ply knit fabrics, more particularly to multi-ply knit fabrics where one of the plies contains polytetrafluoroethylene (PTFE) yarns.

BACKGROUND

A fabric that is cool to touch and the cooling that is activated by air flow is highly desirable for wearer in the warmer environment or a performance/sportswear. In addition to performance wear, such fabric will find application in varieties of textile application. A desirable fabric would be an infrared-transparent visible-opaque fabric (ITVOF), which utilizes the human body's innate ability to thermally radiate heat as a cooling mechanism. Thus there is a need for a cooling textile.

BRIEF SUMMARY OF THE INVENTION

A multi-ply knit fabric having an upper and lower surface, wherein the fabric contains a first knit ply and a second knit ply. The first knit ply contains a plurality of first yarns and forms the upper surface of the fabric. The second knit ply contains a plurality of polytetrafluoroethylene (PTFE) yarns, where the PTFE yarns have a density of about 2 to 2.3 g/cm$^3$, a transmission in the IR region of 8-10 μm at least about 40%, and a thermal conductivity of at least about 0.2 W/(m·K). The second knit ply forms the lower surface of the fabric and if the fabric is formed into an article of clothing, would be the surface of the fabric adjacent the wearer. The first ply and the second ply are integrated through combined portions formed by at least one method selected from the group consisting of interlacing first yarns among the PTFE yarns of the second knit ply, interlacing PTFE yarns among the first yarns of the first knit ply, and interlacing a plurality of third yarns among the first yarns of the first knit ply and the PTFE yarns of the second knit ply.

BRIEF DESCRIPTION OF THE DRAWINGS

FIG. 6 is a knit diagram of the multi-ply knit fabric according to one embodiment of the invention.

DETAILED DESCRIPTION

The challenge is developing a textile that is transparent to IR where human body radiates but opaque to visible light. Most textile materials (cotton, polyester, nylon etc) strongly absorb human body radiation and have very low IR transparency. Polyolefins such as polyethylene (PE), polypropylene (PP), polytetrafluoroethylene (PTFE), polyvinylidene fluoride (PVDF) have only aliphatic C—C, C—H, and C—F bonds and have narrow absorption peaks centered at the wavelengths of 3.4, 3.5, 6.8, 7.3, and 13.7 μm, which are all far away from the peak of human body radiation. It would be ideal to create a fabric in which the face has the ability to block the radiation from outside and the back (surface next to skin) has the ability to bring the radiative heat close to the outer surface of the fabric to dissipate into the environment through convection. In addition, if the back of the fabric (next to skin) has high thermal conductivity, the fabric will be able to distribute the thermal energy from the body throughout the surface of the fabric more efficiently to take advantage of the greater surface area. Since vaporization is the primary mechanism of heat loss from the body at higher temp (>30° C.), hydrophobic back and hydrophilic face will lead to good pumping of moisture from the skin to the environment. PTFE has almost 10× higher thermal conductivity or lower thermal resistance than polyester, cotton or other typical textile materials. PTFE is transparent in the IR region where human body emits. It is also hydrophobic and has very low friction co-efficient, which are beneficial for the wearer in terms of comfort.

Human body is typically warmer than the environment. Thus facilitating the heat transfer from the human body to the fabric will lead to more efficient heat loss from body to the environment. Greater heat loss contributes to the better performance for application of cooling fabric. Contact area is one of the most important determinant of how warm or cool a fabric feels to an individual. A smoother and flat surface increases the area of contact and the heat transfer, thereby will create a fabric with greater cooling efficiency.

Figure 1:
FIG. 1 is an illustration of a cross-section of the multi-ply knit fabric according to one embodiment of the invention.
Figure 2:
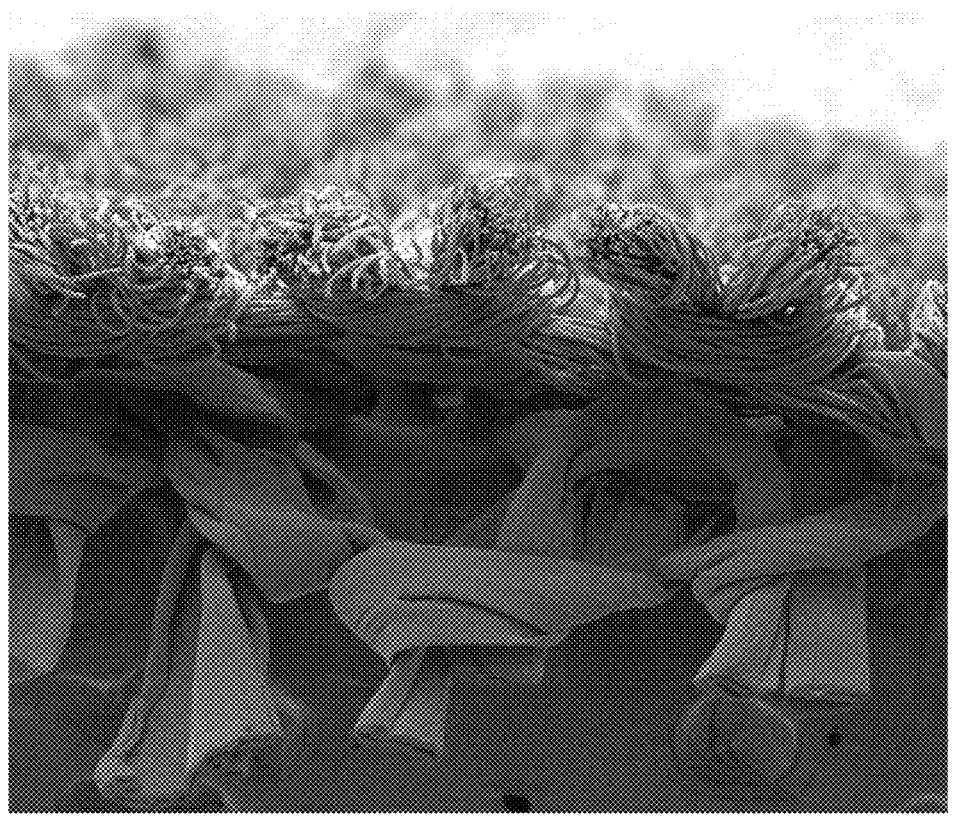
FIG. 2 is a is a photo-micrograph of a cross-section of the multi-ply knit fabric according to one embodiment of the invention.
Figure 3:
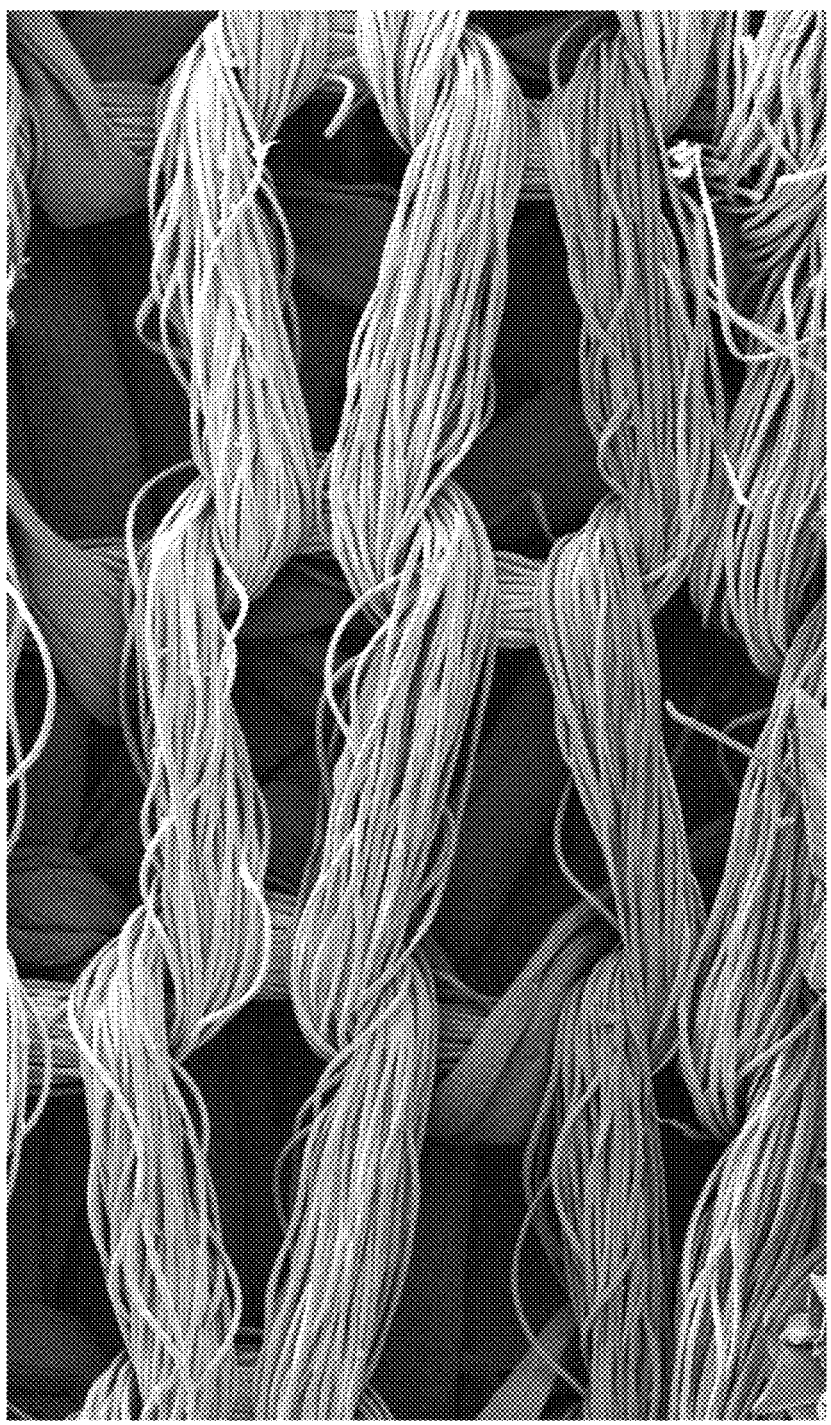
FIG. 3 is a photomicrograph of the upper surface of the multi-ply knit fabric of FIG. 2.
Figure 4:
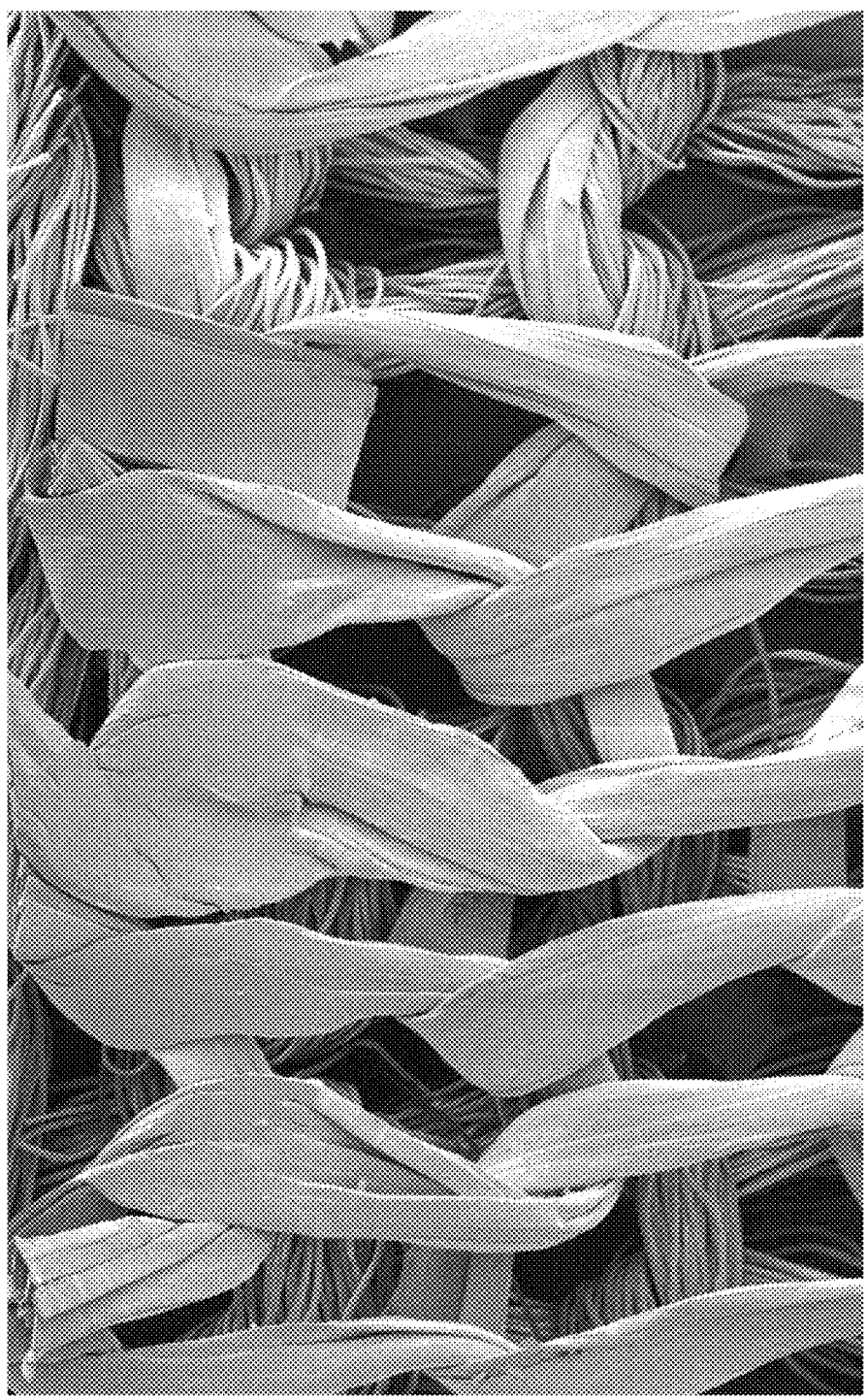
FIG. 4 is a photomicrograph of the lower surface of the multi-ply knit fabric of FIG. 2.

Referring now to FIG. 1, there is shown an illustration of a cross-section of one embodiment of the multi-ply knit fabric 10. The knit fabric 10 has an upper surface 10a and a lower surface 10b. When the fabric 10 is made into a garment, preferably the lower surface 10b would be facing the wearer and upper surface 10a would be facing away from the wearer. The knit fabric 10 of FIG. 1 is shown containing 2 plies; a first knit ply 100 and a second knit ply 200. The knit fabric 10 is a unitary material that is formed together in a knitting machine with the two plies separated by a dashed line. The plies 100 and 200 are not formed as discrete knit layers and then joined together in a later operation. FIG. 2 is a photomicrograph of a cross-section of one embodiment of the multi-ply knit fabric 10. FIG. 3 is a photomicrograph of the upper surface (first knit ply) of the multi-ply knit fabric of FIG. 2 and FIG. 4 is a photomicrograph of the lower surface (second knit ply) of the multi-ply knit fabric of FIG. 2.

The multi-ply knit fabric 10 may be made by any suitable knitting method, including both warp knitting and weft (or circular) knitting. Circular knitting is preferred in some embodiments, as it tends to be more cost efficient. The two plies may have the same knit construction or different.

The first knit ply 100 comprising a plurality of first yarns and forms the upper surface 10a of the fabric 10. The first yarns in the first knit ply 100 may be any suitable yarn. "Yarn", in this application, as used herein includes a monofilament elongated body, a multifilament elongated body, ribbon, strip, yarn, tape, fiber and the like. The first knit ply 100 may contain one type of yarn or a plurality of any one or combination of the above. The yarns may be of any suitable form such as spun staple yarn, monofilament, or multifilament, single component, bi-component, or multi-component, and have any suitable cross-section shape such as circular, multi-lobal, square or rectangular (tape), and oval. In one preferred embodiment, the first ply 100 contains multifilament polyester yarns as these have been shown to have good performance at low cost.

The first knit ply may have any suitable knit pattern and be formed by any suitable yarns. The yarns in the first ply may be a single plurality or type of yarn (e.g., the fabric can be formed solely from yarns comprising a blend of cellulosic yarns and synthetic yarns, such as polyamide yarns), or the textile can be formed from several pluralities or different types of yarns (e.g., the fabric can be formed from a first plurality of yarns comprising cellulosic yarns and polyamide yarns and a second plurality of yarns comprising an inherent flame resistant yarn). The yarns may be formed of (but are not limited to) cellulosic yarns (such as cotton, rayon, linen, jute, hemp, cellulose acetate, and combinations, mixtures, or blends thereof), polyester yarns (e.g., poly(ethylene terephthalate) yarns, poly(propylene terephthalate) (PET) yarns, poly(trimethylene terephthalate) yarns), poly(butylene terephthalate) yarns, and blends thereof), polyamide yarns (e.g., nylon 6 yarns, nylon 6,6 yarns, nylon 4,6 yarns, and nylon 12 yarns), polyvinyl alcohol yarns, an elastic polyester-polyurethane copolymer (SPANDEX®), flame-resistant meta-aramid (NOMEX®) and combinations, mixtures, or blends thereof.

The second knit ply 200 comprising a plurality of polytetrafluoroethylene (PTFE) yarns and forms the lower surface 10b of the fabric 10. Preferably, if the fabric 10 is made into a garment, the second knit ply 200 faces the wearer and is preferably in direct contact with the wearer's skin. The lower surface 10b of the fabric 10 has a surface roughness of less than about 500 µm, preferably less than about 200 µm. PTFE yarn could be of any denier or sizes. In one preferred embodiment, 220 denier PTFE is used and in another embodiment, 100 denier PTFE yarn is used. However, depending on the desired weight (oz per sq. yd) and other properties, the denier of the PTFE yarn could be smaller or larger.

The PTFE yarns have a density of about 2 to 2.5 $g/cm^3$, more preferably about 2.0 to 2.3 $g/cm^3$, more preferably about 2.15 to 2.25 $g/cm^3$. Typical textile yarns, such polyester, nylon or cotton have density less than 1.6 $g/cm^3$. The PTFE yarns have a transmission in the IR region of 8-10 µm at least about 40%, more preferably at least about 60%. In case of polyester, it has C—O stretching frequency from 7.7-10 micron and C—H bending from 7.8-14.5 micron, which leads to reduced transmission, 20% or less in the IR region of 8-10 micron. I has been shown that this 20% of less transmission in the IR region of 8-10 microns produces a fabric with less active cooling. The PTFE yarns also have a thermal conductivity of at least about 0.2 W/(m·K), more preferably at least about 0.23 W/(m·K), more preferably at least about 0.25 W/(m·K). Polyester yarn has much lower thermal conductivity of ~0.15 W/(m·K). Preferably, the PTFE yarns have a generally rectangular cross-sectional shape.

Figure 5:
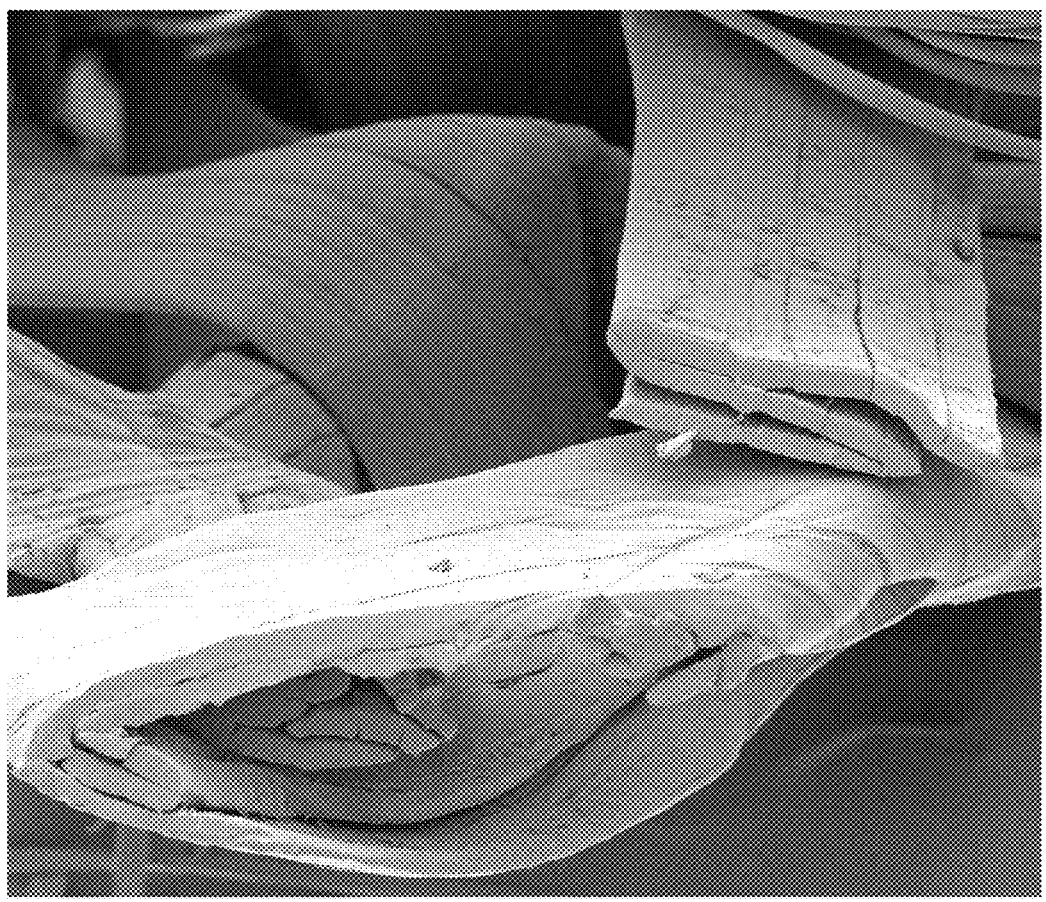
FIG. 5 is a photomicrograph of some PTFE yarns in the knit fabric.

When measuring aspect ratio, the cross-section of the yarn is measured across the entire width (even if the tape is folded onto itself). In one embodiment, the PTFE yarns have a cross-section aspect ratio across the entire width of between about 20:1 to 100:1. Typical flat polyester has the aspect ratio of less than 5:1. Typical PTFE yarn is used in a folded state, meaning that there are fold lines running along the length of the tape yarns and portions of the yarn lay on other portions of the yarn (sometimes like an accordion) such as can be seen in FIG. 5. If the aspect ratio is measured of the folded PTFE yarn, the aspect ratio would be between about 10:1 to 2:1.

The first 100 and second 200 plies are integrated through combined portions, this is preferably done at the time of knitting such that the fabric 10 is created as a multi-ply knit fabric, not as two separate knit fabrics that are then joined in a subsequent process step. This integration may be from one of the following methods, or a combination of the methods.

The first method is interlacing first yarns from the first ply among the PTFE yarns of the second knit ply, meaning that a portion of the first yarns from the first ply leave the first ply, travel down into the second ply where they are interlaced with yarns within the second ply, and then travel back up to the first ply.

The second method is interlacing PTFE yarns from the second ply among the first yarns of the first knit ply, meaning that a portion of the PTFE yarns from the second ply leave the second ply, travel up into the first ply where they are interlaced with yarns within the first ply, and then travel back down to the second ply to the first ply.

The third method is interlacing a plurality of third yarns among the first yarns of the first knit ply and the PTFE yarns of the second knit ply. This means that a third yarn (which may be the same or different yarn than the first yarns and/or PTFE) travels between the plies, interlacing with yarns from both plies and in essence, tying them together. Preferably, the third yarns comprise PTFE yarns.

In a preferred embodiment, the second method is used to interlace the first 100 and second 200 ply together. This method is preferred because of the lower complexity during the knitting process using the circular knitting.

In one embodiment, the multi-ply knit fabric is made using what is referred to as a flat back mesh construction. In this construction, the yarns are evenly spaced on the flat side, while the yarns are not spaced evenly on the mesh side (PTFE side) (open). The knitting diagram for this construction can be seen in FIG. 6. Preferably, the second ply is more open than the first ply, meaning that there are gaps in the second ply (so that when looking at the lower surface of the fabric 10, some of the first ply 100 can be seen through the gaps in the second ply 200. The mesh allows the moisture from the human skin to transport more efficiently to the environment, while minimizing the materials use. PTFE is preferably used in the mesh side. In the mesh side, the gaps between two yarn could be up to 0.5-1 mm.

Thickness of the both faces are almost equally distributed, while contents of different yarns are controlled by changing the gap between the yarns in the mesh side. Tightness of the knitting is also controlled to achieve the total fabric thickness. Typical fabric thickness can be varied from 0.25-0.8 mm.

In one embodiment, the fabric 10 contains a third knit layer. Preferably, this third knit layer is on the first ply (on the side opposite to the second ply) or between the first and second plies. When the fabric 10 contains a third ply, the second play preferably still forms the lower surface 10b of the fabric 10. The third layer may be knitted from any of the materials (or combinations of materials) disclosed as suitable materials for the first 100 or second 200 ply and is preferably knit as the same time and integral with the first and second plies.

It is preferred to have the amount of PTFE yarns in the fabric 10 (as a whole) be as low as possible due to the cost of the PTFE yarns in relation to the other yarns in the fabric 10. In one embodiment, the fabric 10 comprises less than about 75% by weight PTFE yarns. In another embodiment, the fabric 10 comprises less than about 50% by weight PTFE yarns. In another embodiment, the fabric 10 comprises between about 5 and 75% by weight PTFE yarns. It is believed to be most important to concentrate the PTFE yarns on the lower surface 10b of the fabric 10 to maximize their cooling effect for the wearer of the fabric 10. In one embodiment, the second knit ply comprises at least about 90% by weight PTFE yarns. In another embodiment, the lower surface 10b comprises at least about 90% by weight PTFE yarns.

In one embodiment, the multi-ply knit fabric is made into an article of clothing. The article of clothing is preferably made such that the lower surface 10b (second ply 200) faces the wearer and forms the innermost surface of the article of clothing.

This article of clothing may be any suitable article but is preferably an article of clothing that is worn next to the wearer (so preferably a shirt versus a coat). The mechanisms of the cooling work more efficiently when the article of clothing is in direct contact with the skin of the wearer. The article of clothing could be, for example, a short, pair of pants, tights, jacket, socks, hat, or undergarments.

In another embodiment, a garment may use the multi-layer knit fabric in addition to other fabric. For example, a shirt might use the multi-layer knit fabric on the torso and another fabric in the sleeves. Additionally, the multi-layer knit fabric could also be used as an insert.

Test Methods

Weight of the fabric was measured using ASTM D 3776. Air permeability was measured using ASTM D 737. MVTR was measured ASTM E 96-95: Water Vapor Transmission of Materials, modified procedure B; both Open Jar Method and with the Air Flow method. Q-Max is the measurement of the maximum heat loss that can occur when the skin touching objects or other materials. Larger Q-max, cooler the material, in this case fabric, to human touch. The Kawabata thermal tester (Thermolabo) is used to measure the Q-max. Intrinsic thermal resistance, apparent intrinsic evaporative resistance, and total heat loss are measured using a sweating guarded hot plate using ASTM F1868, Part C.

EXAMPLES

The table below summarizes the 13 examples. The PTFE yarn used was either 220 den (Lenzing™ Profilen FG02 natural) and 100 den (Lenzing™ Profilen FR110 natural). The polyester yarn used was a multi-filament yarns in a 1 ply or 2 ply 70/72 construction. Examples 1-8 were knitted in flat back mesh construction as shown in FIG. 6. Example 9 was a 50/50 PTFE (220 den)/polyester interlock knit and example 10 was a 100% polyester interlock knit. Examples 1-10 were subjected to navy disperse dyeing process and tentering for testing and evaluation. Example 11 was a commercially available fabric from ADIDAS™ called Climachil which is a double knit, bi-ply. The outerply contains typical multifilament round polyester yarn and the inner ply contains multifilament flat polyester yarns.

| | Yarn content | Polyester yarn type | PTFE yarn type | Ounces per square yard (OSY) oz/yd² |
|---|---|---|---|---|
| Ex. 1 | 69%/31% PTFE/polyester | 1/70/72 | 220 den | 5.7 |
| Ex. 2 | 53%/47% PTFE/polyester | 2/70/72 | 220 den | 8.8 |
| Ex. 3 | 36%/64% PTFE/polyester | 2/70/72 | 100 den | 6.0 |
| Ex. 4 | 54%/46% PTFE/polyester | 1/70/72 | 100 den | 3.7 |
| Ex. 5 | 77%/23% PTFE/polyester | 1/70/72 | 220 den | 5.5 |
| Ex. 6 | 62%/38% PTFE/polyester | 2/70/72 | 220 den | 7.8 |
| Ex. 7 | 45%/55% PTFE/polyester | 2/70/72 | 100 den | 5.6 |
| Ex. 8 | 63%/37% PTFE/polyester | 1/70/72 | 100 den | 3.3 |
| Ex. 9 | 50%/50% PTFE/polyester | 1/70/72 | 220 den | 6.8 |
| Ex. 10 | 100% Polyester | 1/70/72 and 2/70/72 | — | 4.9 |
| Ex. 11 | See description above | — | — | 4.2 |

The examples were tested for air permeability, moisture vapor transmission rate (MVTR) (ASTM E 96-95: Water Vapor Transmission of Materials, modified procedure B; both Open Jar Method and with the Air Flow) (g/m²/24 hrs) and Q-max (watts/cm²) of back (skin side) and face of the fabrics.

| | air perm (cfm) | MVTR (Open Jar) g/m²/24 hrs | MVTR (Air Flow) g/m²/24 hrs | Q-max (back) watts/cm² | Q-max (face) watts/cm² |
|---|---|---|---|---|---|
| Ex. 1 | 320 | 882.37 | 6090 | 0.213 | 0.114 |
| Ex. 2 | 206 | 879.53 | | 2.52 | 0.134 |
| Ex. 3 | 235 | 862.51 | | 0.187 | 0.128 |
| Ex. 4 | 403 | 876.70 | | 0.167 | 0.113 |
| Ex. 5 | 406 | 848.33 | 6169 | 0.214 | 0.108 |
| Ex. 6 | 227 | 845.49 | | 0.215 | 0.117 |
| Ex. 7 | 270 | 913.58 | 5888 | 0.169 | 0.118 |
| Ex. 8 | 466 | 842.65 | | 0.154 | 0.104 |
| Ex. 9 | 127 | 868.19 | 2205 | 0.165 | 0.106 |
| Ex. 10 | 140 | 811.44 | 2374 | 0.122 | 0.118 |
| Ex. 11 | 202 | 713.95 | | 0.155 | 0.111 |

As one can see form the table above, examples containing PTFE yarn (Examples 1-9) has slightly higher MVTR (~840-900 g/m²/24 hrs) than the polyester examples (Examples 10-11) (~700-800 g/m²/24 hrs). Comparing Examples 1, 5, and 7 (knitted with the flat back mesh construction as shown in FIG. 3) had much higher MVTR values in the military method, where there is airflow at the top of the jar compared to Examples 10 and 13 (without the PTFE yarns). This indicates the moisture vapor transmission is induced by the airflow.

In terms of cooling effect, the higher the Q-max, cooler the fabric feels to its touch. The Q-max measurement using Kawabata thermal tester (Thermo Labo) showed higher Q-max values on both sides of the fabric of Examples 1-9 compared to Examples 10-11.

| Sample ID | Intrinsic Thermal resistance ($R_{cf}$) (Δ °C.) (m²)/W | Apparent intrinsic evaporative resistance ($R_{ef}$) (ΔkPa)(m²)/W | Thermal Resistance ($I_t$) Clo | Total Heat loss (Qt) W/m² | Thickness mm |
|---|---|---|---|---|---|
| Ex. 1 | 0.004 | 0.00206 | 0.492 | 869.36 | 0.42 |
| Ex. 2 | 0.006 | 0.00264 | 0.506 | 798.26 | 0.57 |
| Ex. 3 | 0.007 | 0.00247 | 0.509 | 812.34 | 0.5 |
| Ex. 4 | 0.007 | 0.00098 | 0.512 | 1008.92 | 0.35 |
| Ex. 5 | 0.004 | 0.00137 | 0.493 | 959.05 | 0.41 |
| Ex. 6 | 0.006 | 0.00228 | 0.502 | 837.11 | 0.57 |
| Ex. 7 | 0.006 | 0.0018 | 0.504 | 891.68 | 0.45 |
| Ex. 8 | 0.004 | 0.00107 | 0.491 | 1009.41 | 0.31 |
| Ex. 9 | 0.01 | 0.00181 | 0.532 | 871.17 | 0.62 |
| Ex. 10 | 0.009 | 0.00235 | 0.525 | 814.05 | 0.62 |

Total heat loss was measured using a large sweating guarded hot plate as per ASTM F1868 part C and data is summarized in the table above. This measurement confirmed that intrinsic thermal resistance of PTFE yarn based knits with flat back mesh construction fabric (Ex. 1-8) is lower compared to all polyester fabrics (Ex. 10). The evaporative resistance of PTFE containing knits (Ex. 1-8) are lower compared to the all polyester knit (Ex. 10). Lower thermal resistance along with lower evaporative together yielded fabrics with impressive up to 25% improvement in the total heat loss, comparing Ex. 1-8 with Ex. 10.

In conclusion, excellent Q-max, excellent thermal conductivity (lower resistance), lower evaporative resistance, higher heat loss for PTFE based flat back mesh knits (Examples 1-8). All these properties are important for active cooling application in textile.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A multi-ply knit fabric having an upper and lower surface, wherein the fabric comprises:
    a first knit ply comprising a plurality of first yarns, wherein the first knit ply forms the upper surface of the fabric;
    a second knit ply comprising a plurality of polytetrafluoroethylene (PTFE) yarns, wherein the PTFE yarns have a density of 2 to 2.3 g/cm³, a transmission in the IR region of 8-10 μm at least 40%, and a thermal conductivity of at least 0.2 W/(m·K), wherein the second knit ply forms the lower surface of the fabric;
    wherein the first ply and the second ply integrated through combined portions formed by at least one method selected from the group consisting of interlacing first yarns among the PTFE yarns of the second knit ply, interlacing PTFE yarns among the first yarns of the first knit ply, and interlacing a plurality of third yarns among the first yarns of the first knit ply and the PTFE yarns of the second knit ply.

2. The multi-layer knit fabric of claim 1, wherein the PTFE yarns have a generally rectangular cross-sectional shape.

3. The multi-layer knit fabric of claim 1, wherein the fabric comprises less than 75% by weight PTFE yarns.

4. The multi-layer knit fabric of claim 1, wherein the fabric comprises less than 50% by weight PTFE yarns.

5. The multi-layer knit fabric of claim 1, wherein the second knit ply comprises at least 90% by weight PTFE yarns.

6. The multi-layer knit fabric of claim 1, wherein the PTFE yarns comprise a density of 2.15 to 2.25 g/cm³.

7. The multi-layer knit fabric of claim 1, wherein the PTFE yarns comprise a transmission in the IR region of 8-10 μm at least 60%.

8. The multi-layer knit fabric of claim 1, wherein the PTFE yarns comprise a thermal conductivity of at least 0.23 W/(m·K).

9. The multi-layer knit fabric of claim 1, wherein the rectangular cross-sectional shape of the PTFE yarns has a width to height ratio of between 20:1 to 100:1.

10. The multi-layer knit fabric of claim 1, wherein the lower surface of the fabric has a surface roughness of less than 500 μm.

11. An article of clothing comprising the fabric of claim 1.

12. An article of clothing comprising a multi-ply knit fabric having an upper and lower surface, wherein the fabric is oriented such that the lower surface of the fabric faces the wearer of the article of clothing, wherein the fabric comprises:
    an first knit ply comprising a plurality of first yarns, wherein the first knit ply forms the upper surface of the fabric;
    a second knit ply comprising a plurality of polytetrafluoroethylene (PTFE) yarns, wherein the PTFE yarns have a density of 2 to 2.3 g/cm³ a transmission in the IR region of 8-10 μm at least 40%, and a thermal conductivity of at least 0.2 W/(m·K), and wherein the second knit ply forms the lower surface of the fabric;

wherein the first ply and the second ply integrated through combined portions formed by at least one method consisting of interlacing first yarns among the PTFE yarns of the second knit ply, interlacing PTFE yarns among the first yarns of the first knit ply, and interlacing a plurality of third yarns among the first yarns of the first knit ply and the PTFE yarns of the second knit ply.

13. The article of clothing of claim 12, wherein the PTFE yarns have a generally rectangular cross-sectional shape.

14. The article of clothing of claim 12, wherein the fabric comprises less than 50% by weight PTFE yarns.

15. The article of clothing of claim 12, wherein the second knit ply comprises at least 90% by weight PTFE yarns.

16. The article of clothing of claim 12, wherein the PTFE yarns comprise a transmission in the IR region of 8-10 μm at least 60%.

17. The article of clothing of claim 12, wherein the PTFE yarns comprise a thermal conductivity of at least 0.23 W/(m·K).

18. The article of clothing of claim 12, wherein the article of clothing is worn directly in contact with the wearer's skin.

19. The article of clothing of claim 12, with in the article of clothing is selected from the group consisting of a shirt, pair pants, tights, jacket, socks, and undergarments.

20. The article of clothing of claim 12, wherein the lower surface of the fabric has a surface roughness of less than 500 μm.

\* \* \* \* \*